W. H. SHURTLEFF.

Assignor, by mesne assignments, to THE AMERICAN HOOK AND BUTTON CO.

Combined Hook and Button.

No. 8,996. Reissued Dec. 16, 1879.

WITNESSES:

Joseph A. Miller Jr

William S. Cooper

INVENTOR:

Wm H. Shurtleff by Joseph A. Miller atty

N. PETERS, PHOTO-LITHOGRAPHER, WASHINGTON, D. C.

UNITED STATES PATENT OFFICE.

WILLIAM H. SHURTLEFF, OF PROVIDENCE, R. I., ASSIGNOR, BY MESNE ASSIGNMENTS, TO THE AMERICAN HOOK AND BUTTON COMPANY.

IMPROVEMENT IN COMBINED HOOK AND BUTTON.

Specification forming part of Letters Patent No. 55,431, dated June 5, 1866; Reissue No. 8,996, dated December 16, 1879; application filed August 1, 1879.

*To all whom it may concern:*

Be it known that I, WILLIAM H. SHURTLEFF, of Providence, in the county of Providence and State of Rhode Island, have invented certain new and useful Improvements in Lacing Boots and Shoes and other articles of wearing-apparel; and I hereby declare the following to be a full, clear, and exact description of the same, reference being had to the accompanying drawings, in which—

Figure 1:
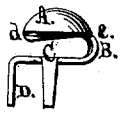
Figure 2:
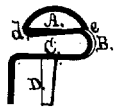
Figure 3:
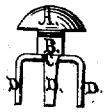
Figure 4:
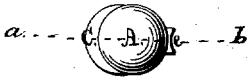
Figure 5:
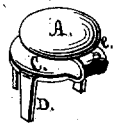
Figure 6:
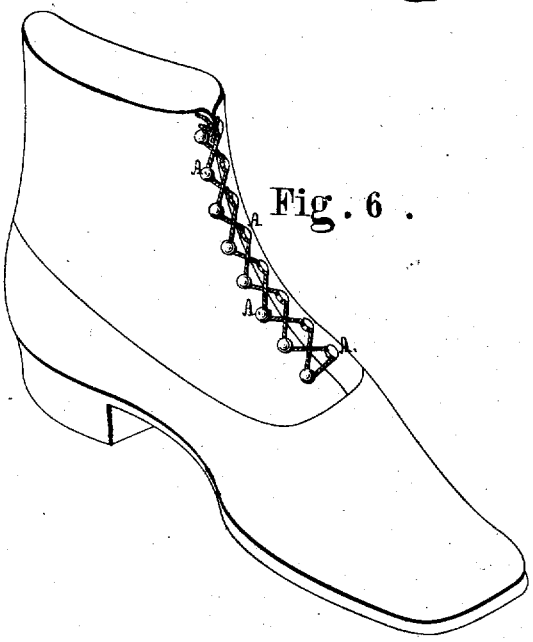

Figure 1 is a side elevation; Fig. 2, a vertical section on line *a b* in Fig. 4. Fig. 3 is a front elevation, Fig. 4 a plan view, and Fig. 5 a perspective view, of a lacing button and hook constructed in accordance with my invention. Fig. 6 is a perspective view of a shoe provided with my improved lacing device.

The object of this invention is to apply to shoes, boots, &c., the hook-lacing—*i. e.*, a lacing in which one or two lacing-cords run externally zigzag-fashion from hook to hook, to draw the parts snugly together in such manner as to avoid the unsightly appearance of hooks, the ridges whereby the pantaloons and other articles of dress are rapidly worn, and other objections attendant upon those heretofore in use; and my invention consists in so forming the lacing-studs that they shall combine the advantage of the button and hook—in other words, while acting as lacing-hooks, they shall be ornamental to the shoe or boot to which they are applied, and present a smooth shielding-surface to the pantaloons or other article of dress coming into frictional contact with the boot; and my invention further consists in the method herein described of fastening the button-hooks to the leather or material of which the shoe or boot is or may be made.

To enable others to make and use my invention, I shall now proceed to describe the manner in which the same is or may be performed.

Referring to the drawings, A is the button, or cap, or shield, consisting of a thin brass or other metal disk struck up in dies to assume a concavo-convex form, the convex side being intended to be on the outside, so as to deflect the pantaloons or other article of dress worn about the shoe or boot. With this cap or shield is connected at *d* the shank B, which is formed of a strip of metal bent under the cap and down at a point diametrically opposite to *d* at C. This latter portion, which is the lacing-stay proper, should be rounded off transversely, so as to avoid frictional wear on the lacing-cord.

The third integral part of the lacing device is the disk C, which may be round or flat, so as to adapt itself readily to the surface of the shoe, and with this disk are connected the prongs D, whereby, on being passed through perforations made by themselves or other instruments, they are clinched to the opposite side of the material of the shoe or boot.

These button-hooks are made in one piece from a single blank, and may be struck off, at two or more successive blows, in suitable dies or machinery.

The manner in which these button-hooks are secured to shoes is shown in Fig. 6. They are placed in two opposite series at a short distance from and in a line parallel with the edge of the two upper portions to be laced, care being taken to place the stays B on the inner side—*i. e.*, on the side nearest the opening to be laced—so that the cords may run between the center of the button and the stay.

Having thus described my invention, I claim as new and desire to secure by Letters Patent—

1. A lacing-hook for boots and shoes, consisting of a button portion formed with a rounded upper surface, and a base adapted to rest upon the outer surface of the boot or shoe, said button and base portions connected by a neck that receives the tie-string, the base portion being provided with means, adapted to be inserted through the material of the boot or shoe, for fastening the lacing-hook in place, all made of a single piece of metal, substantially as set forth.

2. A lacing-hook for boots or shoes, consisting of a button portion and a base connected therewith at one side by a neck having a rounded inner surface, the base portion being provided with means adapted to be inserted through the material of the boot or shoe for fastening the lacing-hook in place, all made of a single piece of metal, substantially as set forth.

WM. H. SHURTLEFF.

Witnesses:
JOSEPH A. MILLER,
J. A. MILLER, Jr.